(12) United States Patent
Schmidt

(10) Patent No.: US 8,057,139 B2
(45) Date of Patent: Nov. 15, 2011

(54) TUBE RESTRAINT AND METHODS

(75) Inventor: Joseph L. Schmidt, Tonica, IL (US)

(73) Assignee: Federal Signal Corporation, Oak Brook, IL (US)

( * ) Notice: Subject to any disclaimer, the term of this patent is extended or adjusted under 35 U.S.C. 154(b) by 368 days.

(21) Appl. No.: 12/357,175

(22) Filed: Jan. 21, 2009

(65) Prior Publication Data

US 2010/0183396 A1 Jul. 22, 2010

(51) Int. Cl.
*B60P 7/12* (2006.01)
(52) U.S. Cl. .......................................................... 410/42
(58) Field of Classification Search .................... 410/35, 410/36, 42, 46; 206/391, 404, 446, 595, 206/596; 248/146, 154, 68.1; 224/404, 405; 211/70.4, 71.01, 85.18; 24/489, 376; 137/376; 108/55.1, 55.5
See application file for complete search history.

(56) References Cited

U.S. PATENT DOCUMENTS

| | | | | |
|---|---|---|---|---|
| RE22,507 E | * | 6/1944 | Heigis | 211/75 |
| 2,606,732 A | * | 8/1952 | Luomala | 248/154 |
| 2,611,495 A | | 9/1952 | Weaver | |
| 2,615,238 A | * | 10/1952 | Highwood | 248/154 |
| 2,650,948 A | * | 9/1953 | Findlay | 174/168 |
| 3,091,348 A | | 5/1963 | Neuhauser | |
| 3,165,205 A | | 1/1965 | Travis, Jr. | |
| 3,229,825 A | | 1/1966 | Brown, Jr. | |
| 3,568,966 A | * | 3/1971 | Lucci | 248/154 |
| 3,603,549 A | * | 9/1971 | Brilando et al. | 248/229.14 |
| 3,662,979 A | * | 5/1972 | Lucci | 248/553 |
| 3,679,065 A | * | 7/1972 | Aurtemma | 312/312 |
| 4,108,408 A | * | 8/1978 | Butti | 248/68.1 |
| 4,224,721 A | | 9/1980 | Ohlson | |
| 4,572,414 A | * | 2/1986 | Blatt | 224/633 |
| 4,707,051 A | * | 11/1987 | Hall | 439/781 |
| 4,729,537 A | | 3/1988 | Turner et al. | |
| 4,936,530 A | * | 6/1990 | Wollar | 248/71 |
| 5,058,764 A | * | 10/1991 | Gaba | 220/481 |
| 5,154,258 A | * | 10/1992 | Krukow | 182/127 |
| 5,769,556 A | * | 6/1998 | Colley | 403/24 |
| 5,927,916 A | | 7/1999 | Kröll et al. | |
| 6,135,686 A | * | 10/2000 | Chasen | 410/120 |
| 6,299,396 B1 | * | 10/2001 | Chasen | 410/120 |
| 6,322,304 B1 | * | 11/2001 | Chasen | 410/120 |
| 6,685,404 B2 | * | 2/2004 | Udivich et al. | 410/42 |
| 7,070,372 B2 | * | 7/2006 | Denike et al. | 410/46 |

FOREIGN PATENT DOCUMENTS

SU 467015 4/1975

* cited by examiner

*Primary Examiner* — Hilary Gutman
(74) *Attorney, Agent, or Firm* — Merchant & Gould P.C.

(57) ABSTRACT

Devices for restraining tubular segments and methods for storing and accessing tubular segments may include a frame arrangement that has a plurality of parallel cradles for holding tubular segments and movable restraining handles for securing the tubular segments. A spring retention assembly may also be provided that has a spring force to hold the restraining handles against the tubular segments. A vehicle can be equipped to have a device for storing and accessing tubular segments, wherein the device is movable between a storage position and an access position.

9 Claims, 11 Drawing Sheets

TUBE RESTRAINT AND METHODS

TECHNICAL FIELD

This disclosure relates to a devices and vehicles for storing tubular segments and methods for storing and accessing tubular elements.

BACKGROUND

Underground storm sewer systems often require periodic maintenance or service. One such instance is when a pipeline becomes clogged with debris, such as leaves, and ceases to function. To clear the obstruction, mobile vehicles have been developed which can vacuum the debris out of the piping system and into a debris collection tank. Generally, a variety of hoses, tubes and pipes are utilized to ensure vacuuming occurs at an appropriate location for debris removal, such as the bottom of a catch basin. These types of tubes may also be used to assist in debris removal from a hard surface, such as a street or parking lot. When these hoses, tubes and pipes are not in use, they are usually stored somewhere on the exterior of the vehicle. To date various storage methods have been used for this purpose such as racks, storage tubes and rotatable frames.

SUMMARY OF THE DISCLOSURE

This disclosure relates to storage mechanisms for holding and securing tubular segments that can be mounted to a vehicle, and methods for their use.

The storage mechanism may include a frame arrangement defining at least a pair of open ended cradles for holding a tubular segment in a horizontal position and at least one restraining handle that is connected to the frame arrangement and movable between a storage position and a release position. In the storage position, the handle is moved to extend over at least one open ended cradle thereby securing the tubular segment to the frame arrangement. In the release position the handle is moved such that the open ended cradle is free of coverage thereby allowing the tubular segment to be removed from the frame arrangement.

The cradles may also be characterized as being parallel and formed from brackets thereby defining a segment holding volume therebetween for holding a tubular segment wherein the storage position includes the gripper extending into the segment holding volume and the release position includes the gripper being adjacent to and not extending into the segment holding volume.

The storage mechanism may also have restraining handles that are longitudinally displaceable and which are held against the tubular segment by a spring retention assembly when the restraining handle is in the storage position. Additionally, the storage mechanism may also have a locking mechanism for preventing the restraining handle from rotating out of the storage position.

The storage mechanism may also be mounted to a vehicle and movable between a storage position and an access position. In the storage position, the cradles and the restraining handles generally face a surface of the vehicle. In the access position, the cradles and the restraining handle face generally away from the surface of the vehicle so that a tubular segment can be accessed.

This disclosure also relates to a method of storing tubular segments. In a method for storing a tubular segment, the method can contain the steps of orienting a tubular segment into at least a pair of parallel cradles that are defined by a pair of brackets and securing the segment in the cradles by rotating a first handle to move a gripper of the first handle over a first part of the segment and then rotating a second handle to move a gripper of the second handle over a second part of the segment. The method of storing a tubular segment may also include the step of positioning the first and second handles to a locked position wherein a protrusion member on the handle engages a corresponding recess on a first plate. Additionally, the step of moving the storage to a storage position may also be included.

This disclosure also relates to a method of accessing a tubular segment. In a method for accessing a tubular segment that is secured to cradles of a storage mechanism having first and second movable or rotatable restraining handles, the method can include the steps of moving the storage mechanism from a storage position to an access position, releasing the segment in the cradles by moving the first handle away from the segment and then moving the second handle away from the segment and removing the tubular segment. The method may also include the step of longitudinally displacing each handle away from the cradles such that a locking arrangement is disengaged before the step of moving or rotating the first and second handles.

DETAILED DESCRIPTION

Figure 1:
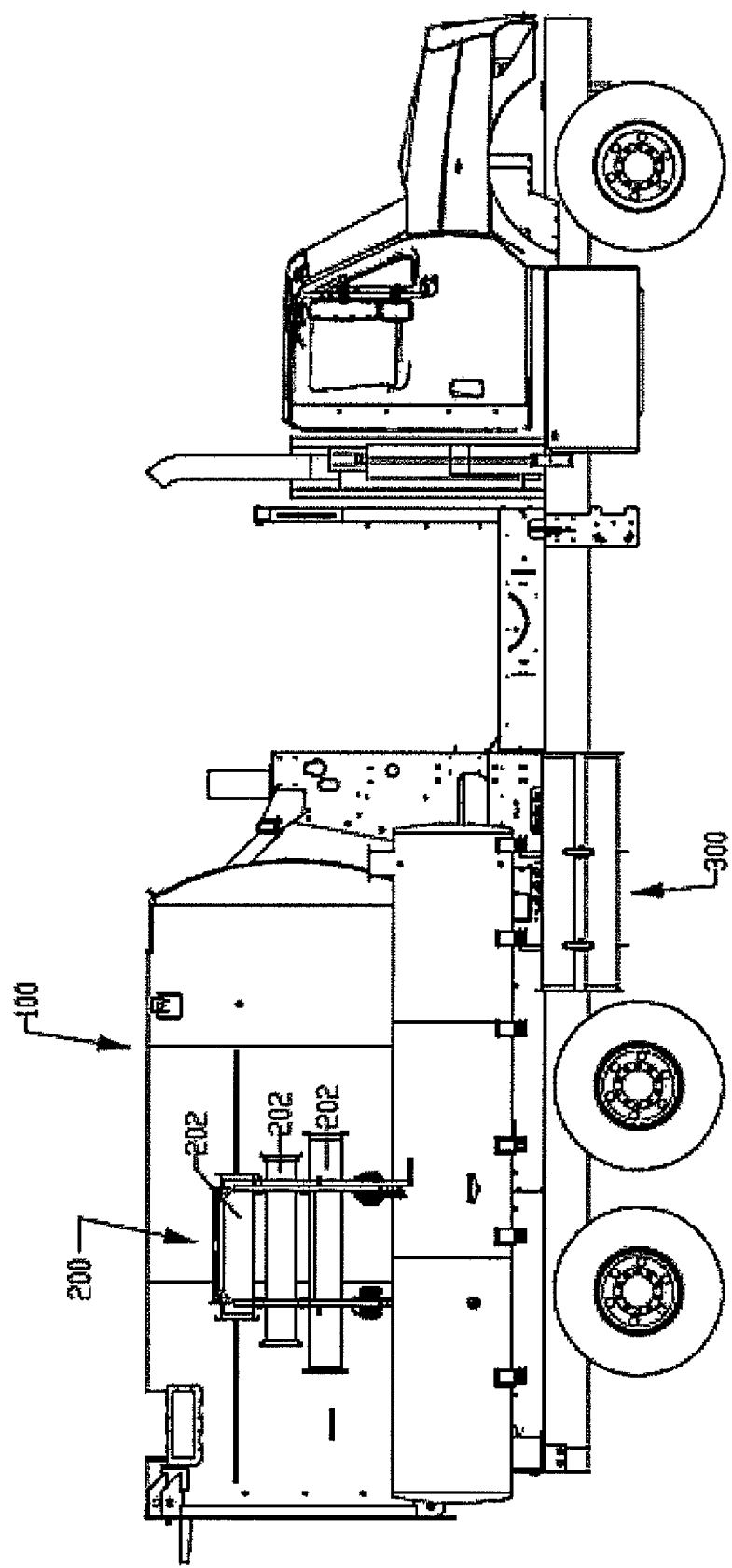
FIG. 1 is a side view of one embodiment of the disclosed storage mechanism, as installed on a vehicle.

Reference will now be made in detail to exemplary aspects of the present invention that are illustrated in the accompanying drawings. Wherever possible, the same reference numbers will be used throughout the drawings to refer to the same or like parts.

Some Problems with Existing Systems & Solutions

Many types of mobile service vehicles must secure various segments of pipe, tube or hose for storage and transportation when they are not being used. In the past, this has been accomplished in a variety of ways. For example, flanged tubes have been vertically stored by placing one end of the tube's flared or flanged end into a mating set of guide grooves or rails that are rigidly mounted to the vehicle. To secure the tube, a removable locking cross bar or latch blocks the end of the guide rails. Another way of storing tubular segments is to place them into a larger storage tube or vessel having an open end which is covered with a removable cap, lid, cross bar or other latch. Frames and racks have also been used which partially encompass and support the tubes. The remaining unsupported area is then covered with a locking bar, over-center clamp, latching retainer arm, ratcheting strap, or elastic strap. If strapping is used, the strap is wrapped, fully or partially, around the tube and then fastened onto the base frame or storage rack utilizing end hooks and/or eyelets.

These types of systems have shortcomings. With respect to the guide groove design, the tube flanges can be difficult to line up into the grooves. Also, storage tubes and storage vessels generally take up large volumes of space on the vehicle. When a frame or rack is used, elastic cords can be difficult to hook and unhook when under high tension which also causes significant safety concerns. If straps are used instead, the stored tubing can be distorted due to excessive tightening of the straps. Further, some of the existing systems do not adequately secure tubular segments that have become irregularly shaped over time with use. Because of these shortcomings and others, improvements in tube storage systems for mobile service vehicles, and in other applications, are desired.

Description of the Figures

Referring now to FIGS. 1-7, an example embodiment of a vehicle 100 and a storage mechanism 200 are shown. Storage mechanism 200 may be mounted to vehicle 100 and is for holding and securing tubular segments 202. By way of non-limiting examples, tubular segments 202 may include cylindrical segments, round tubes, non-round tubes, pipes, bars and hoses. These segments may have regular or irregular contours and may also have open or closed ends.

In the embodiment illustrated, a frame arrangement 210 is shown. Frame arrangement 210 is for holding tubular segments 202. Many different configurations of frame arrangement 210 are possible and useful. In the example embodiment illustrated, in FIG. 5, for example, frame arrangement 210 includes a first bracket 211 and a second bracket 213, each of which define a plurality of open ended cradles, 212 and 214 respectively. Brackets 211, 213 are rigidly connected via first and second support members 215, 216. Brackets 211, 213 are also aligned such that each cradle 212 of first bracket 211 is parallel and directly across from a corresponding cradle 214 on second bracket 213. Frame arrangement 210 may be constructed from a single piece of material whereby the support members are not required. Together, each corresponding pair of cradles forms a segment holding volume for holding a tubular segment 202. It should be understood that cradles 212, 214 may have any profile which can suitably hold a tubular segment 202. In the embodiment shown in FIG. 2, frame arrangement 210 defines three pairs of cradles for holding three tubular segments 202, although it should be understood by one skilled in the art that virtually any number of cradle pairs can be defined.

Figure 6:
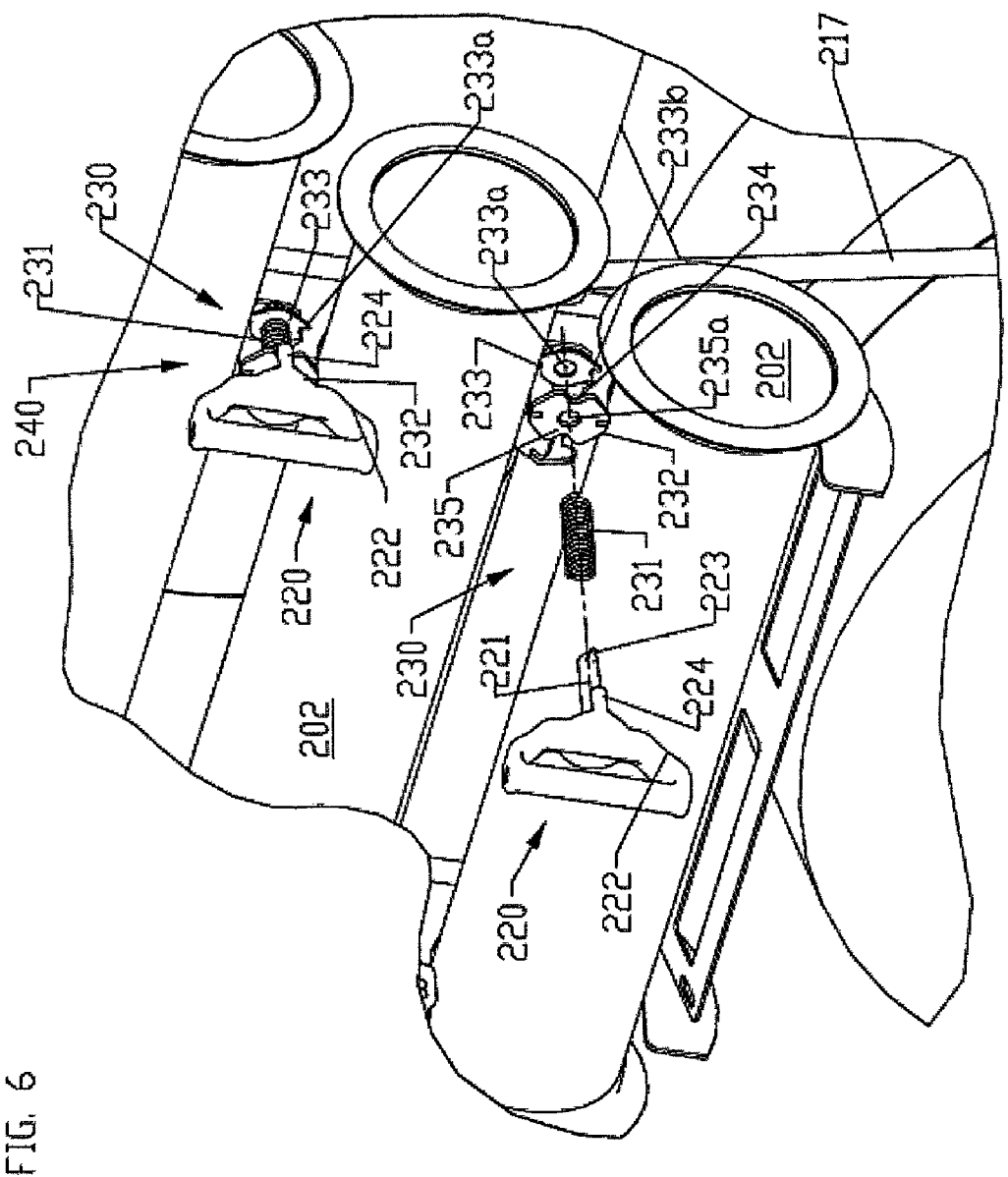
FIG. 6 is a front perspective view of a portion of the disclosed storage mechanism of FIG. 1
Figure 7:
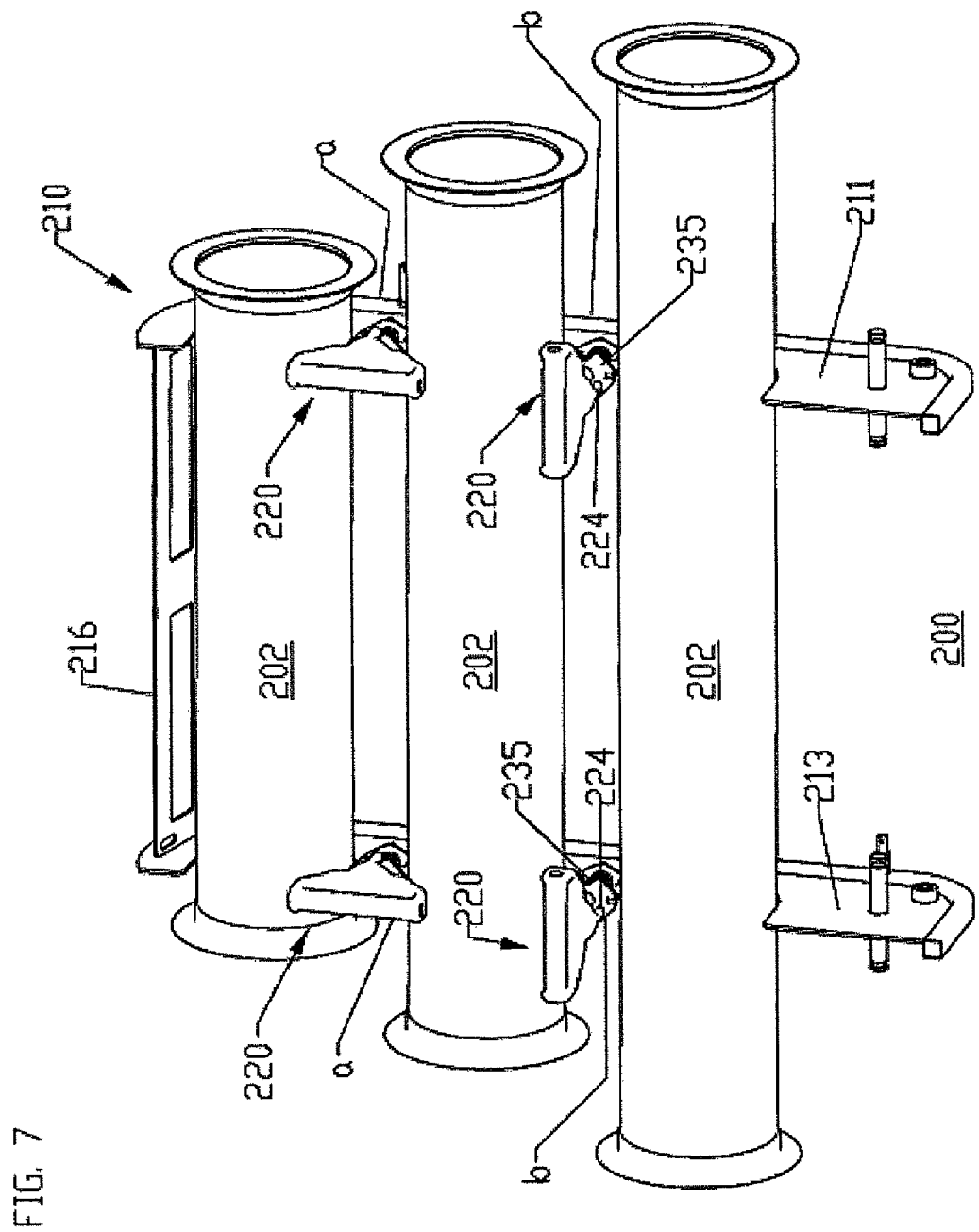
FIG. 7 is a front view of the disclosed storage mechanism of FIG. 1 with one pair of handles in a locked, storage position and another pair of handles in a release position.
Figure 8:
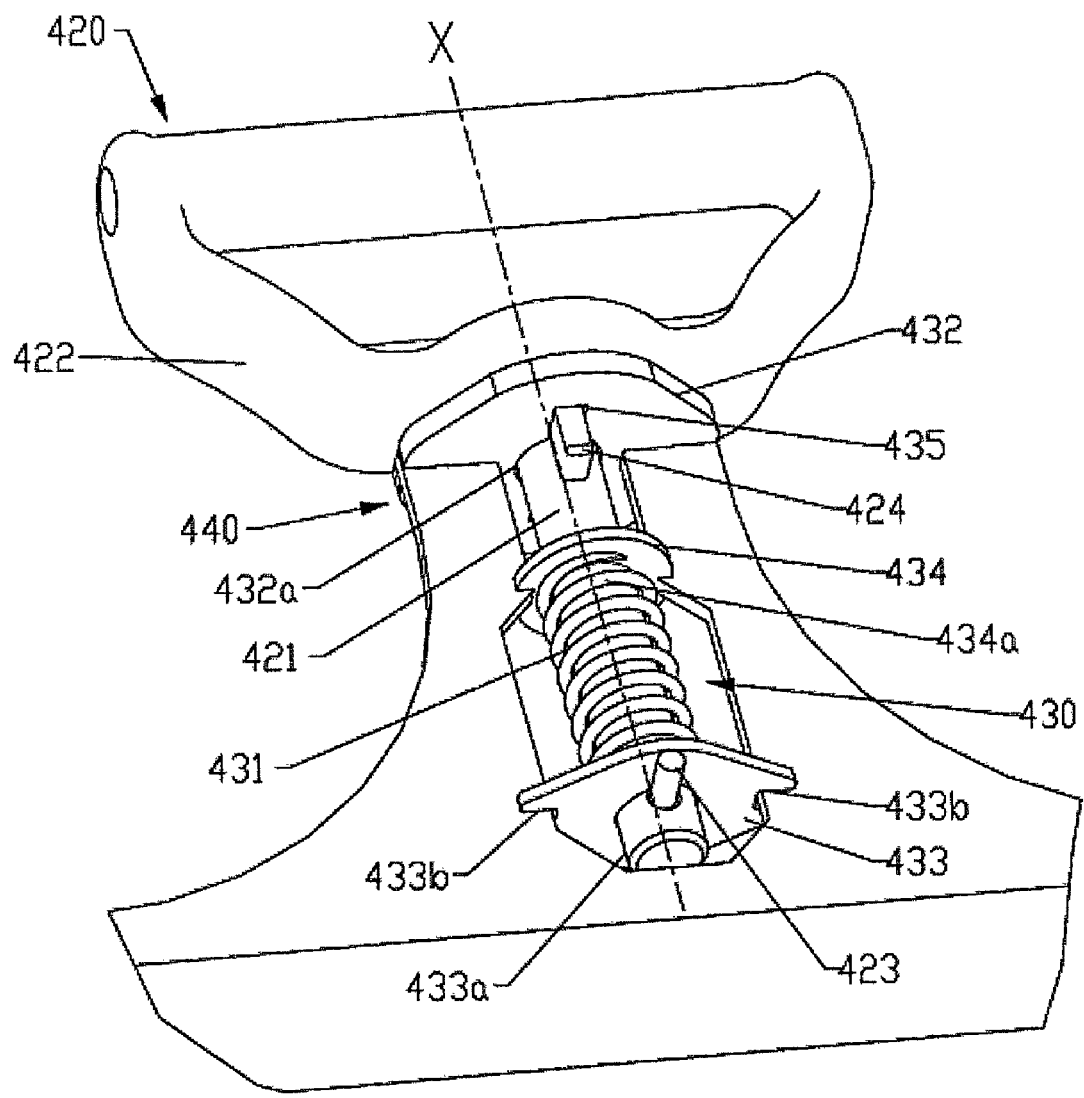
FIG. 8 is a perspective view of a second embodiment of the storage mechanism showing a restraining handle in a locked, storage position.
Figure 9:
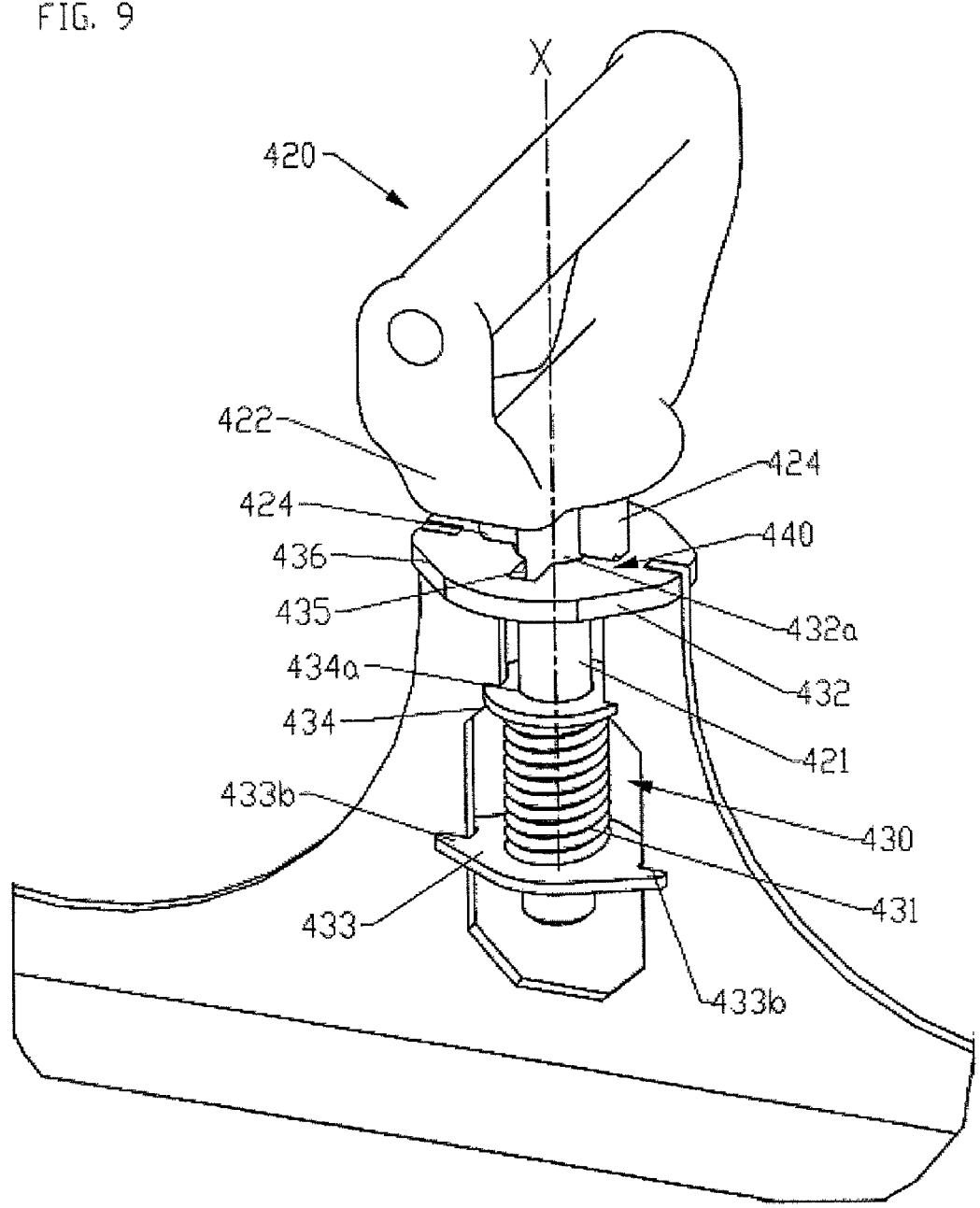
FIG. 9 is a perspective view of a second embodiment of the storage mechanism showing a restraining handle in a release position.
Figure 10:
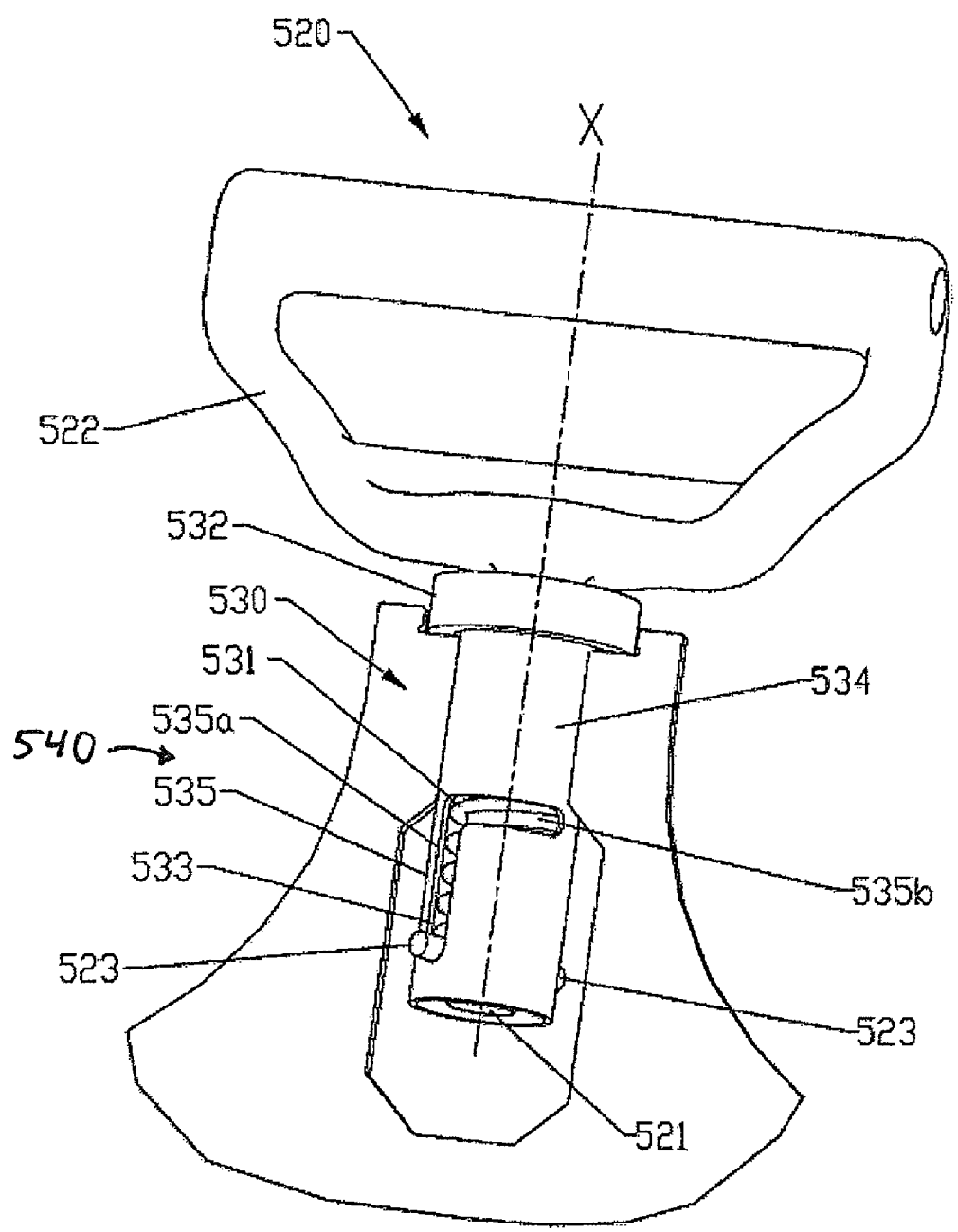
FIG. 10 is a perspective view of a third embodiment of the storage mechanism showing a restraining handle in a locked, storage position.
Figure 11:
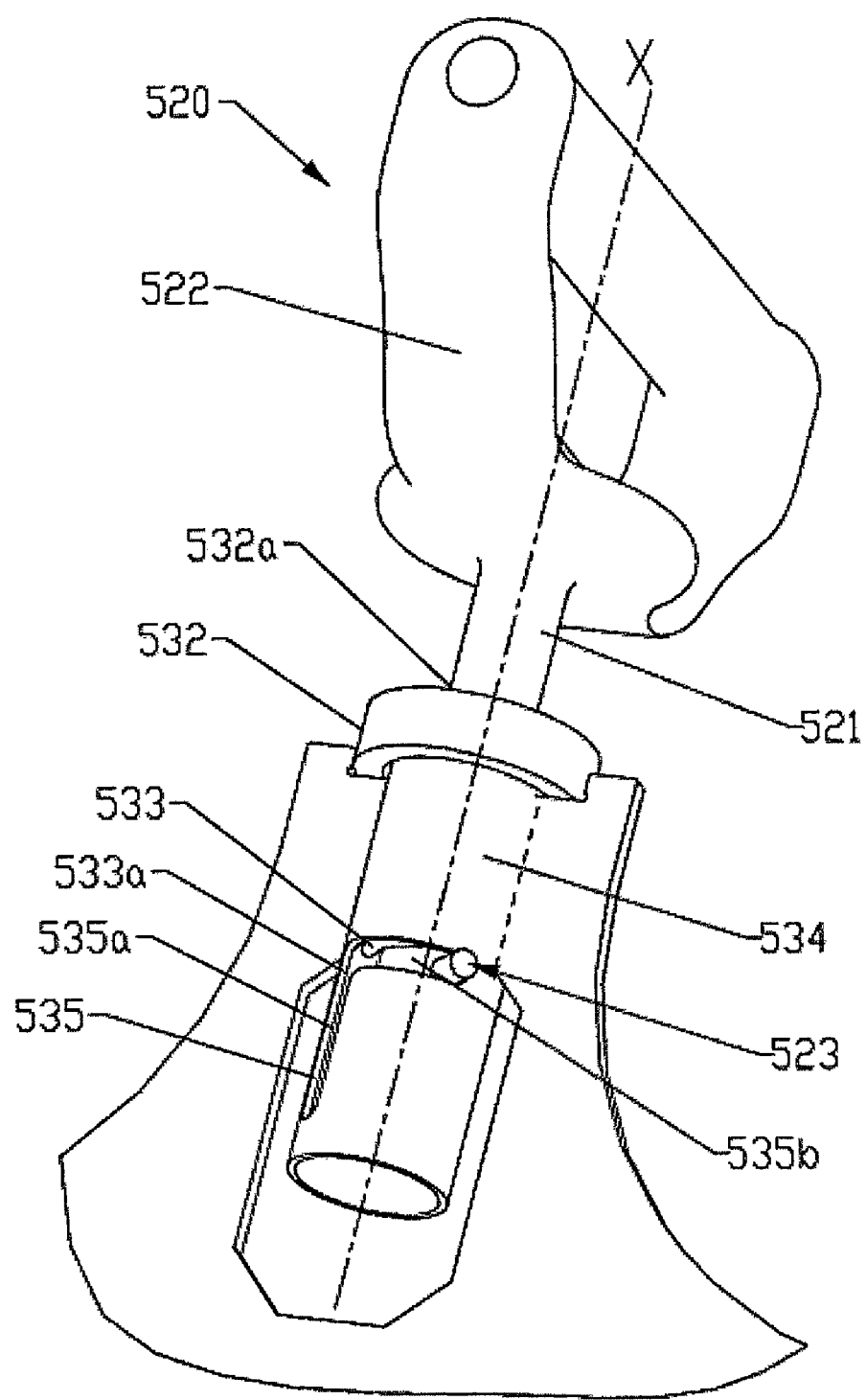
FIG. 11 is a perspective view of a third embodiment of the storage mechanism showing a restraining handle in a release position.

In the embodiment illustrated in FIGS. 1-7, a restraining handle 220 is shown. The restraining handle 220 is for securing a tubular segment 202 into a pair of cradles. Many different configurations of a restraining handle are possible and useful. In the example embodiment illustrated, restraining handle 220 includes a stem portion 221 and a gripper portion 222, the stem portion 221 having a longitudinal axis X. Each restraining handle 220 is connected to a bracket 211 or 213 at a location between adjacent cradles. Restraining handle 220 is also movable between a storage position and a release position. In the example embodiment shown, handle 220 is rotatable about axis X between a storage position and a release position. FIGS. 8-9 show a second embodiment of a restraining handle 420 which incorporates all of the above described features of handle 220. A third embodiment of a restraining handle 520 is shown at FIGS. 10-11 which also incorporates all of the above described features of handle 220. The second and third embodiments are described further below.

Figure 5:
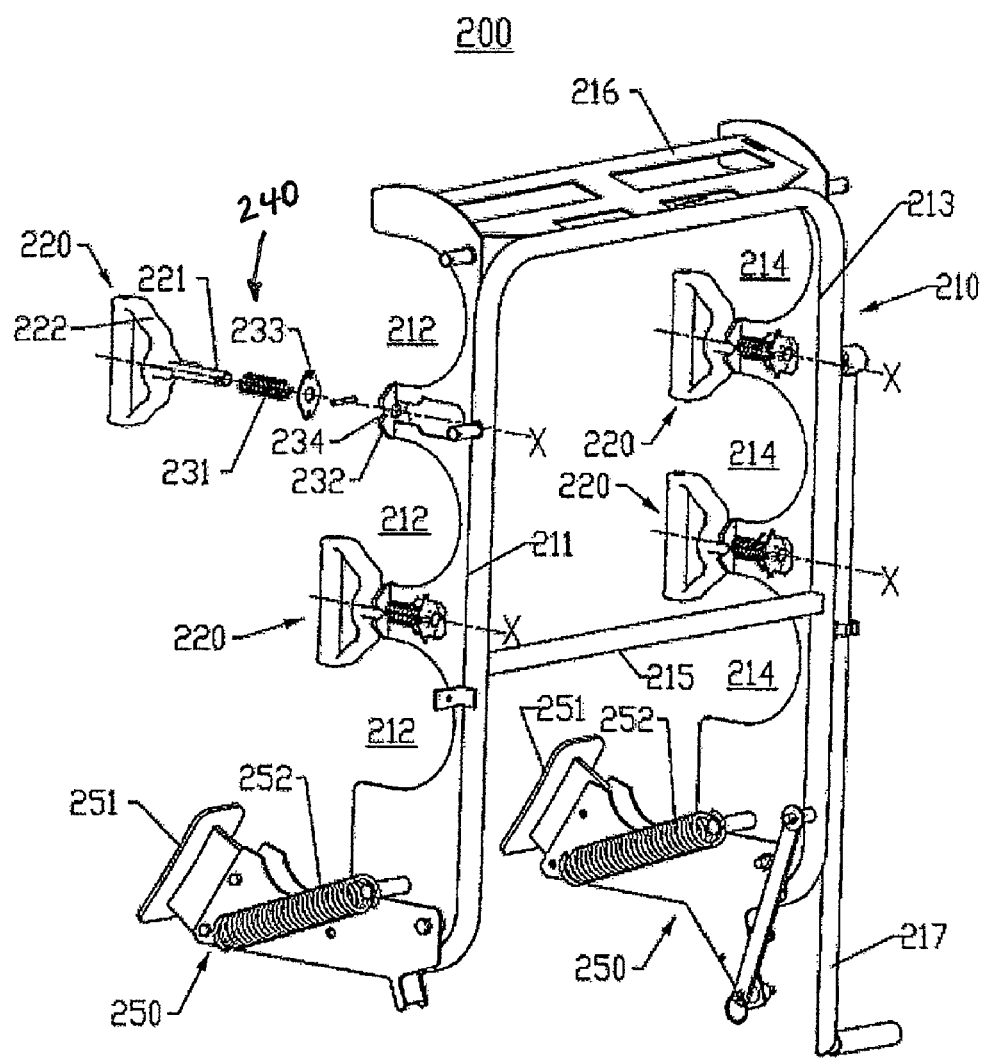
FIG. 5 is a rear perspective view of the disclosed storage mechanism of FIG. 1.

In the storage position, handle 220, 420, 520 is moved or rotated such that gripper portion 223 is parallel to the length of the bracket to which it is attached and such that gripper portion 223, 423, 523 extends into the segment holding volume and over the adjacent open ended cradles. In the storage position, handles 220, 420, 520 secure tubular segments 202 to cradles 212, 214 such that tubular segments 202 cannot be removed. FIGS. 5-6 show handles 220 in the storage position. FIG. 7 also shows at location "a" two handles 220 in the storage position. FIGS. 8 and 10 shows handles 420 and 520 are in the storage position.

In the release position, handle 220, 420, 520 is rotated such that gripper portion 223, 423, 523 is perpendicular to the length of the bracket to which it is attached and such that gripper portion 223, 423, 523 is adjacent to and does not extend into the segment holding volume. This allows cradles 212 or 214 to be free of coverage by handle 220, 420, 520. When handle 220, 420, 520 is in the release position, a tubular segment 202 can be either placed into the cradles or removed from the cradles without interference of handle 220, 420, 520. FIG. 7 shows at location "b" two handles 220 in the release position. FIGS. 9 and 11 show handles 420 and 520 are in the release position.

Figure 4:
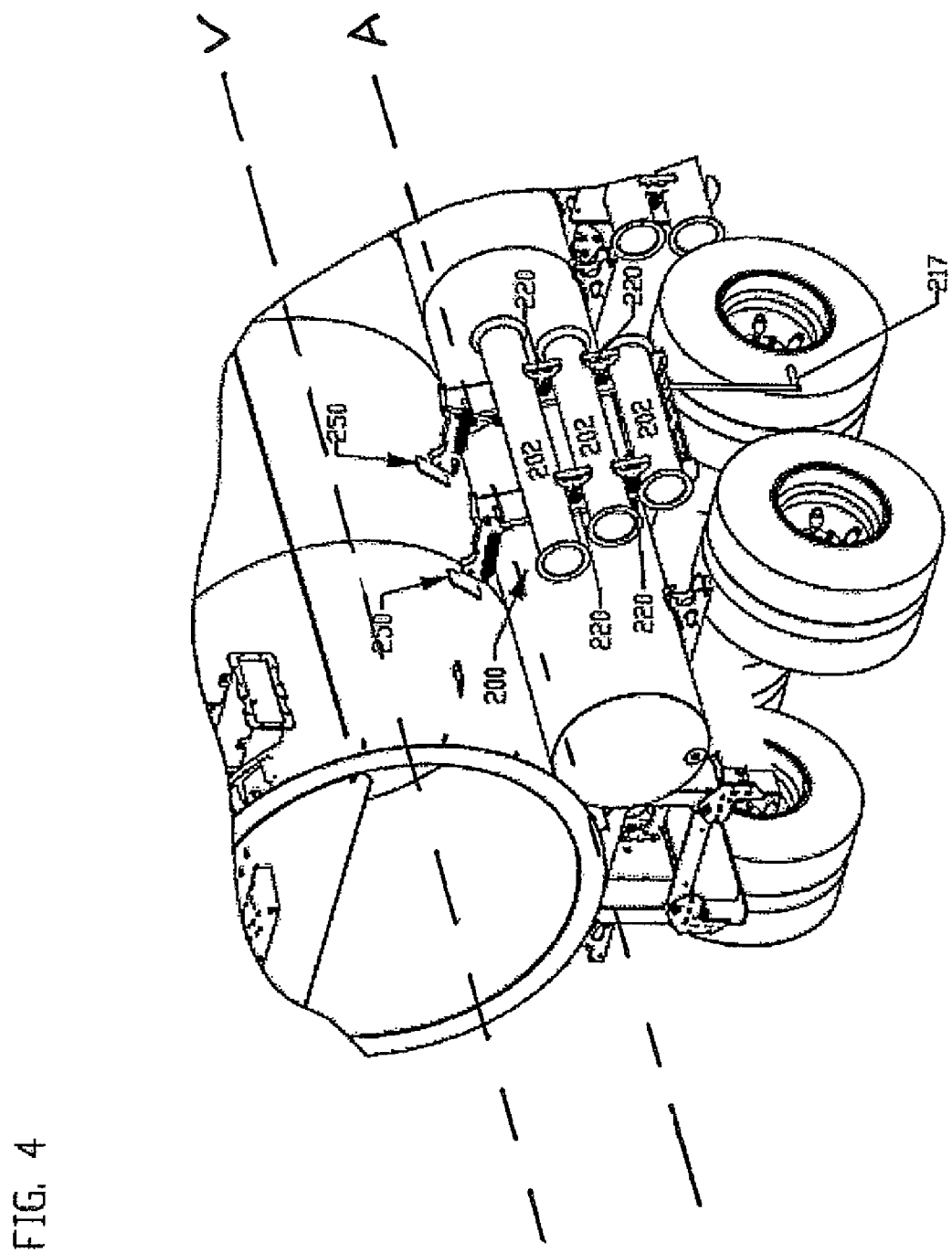
FIG. 4 is a rear perspective view of the disclosed storage mechanism of FIG. 1, as installed on a vehicle and in an access position.

In the embodiment shown, as best viewed at FIGS. 4, 5 and 7, four restraining handles 220 and three pairs of cradles 212, 214 are shown. Together, these elements can retain three tubular segments 202. A tubular segment 202 placed in the middle pair of cradles will be retained by all four restraining handles 220 while a tubular segment 202 placed in one of the end pairs of cradles will be retained by two of the restraining handles 220. Thus, each tubular segment 202 is retained by at least two restraining handles 220 and each restraining handle 220 is capable of retaining more than one tubular element 202. It should also be appreciated that a tubular element 202 could be secured to a frame arrangement that has only one open ended cradle and is retained by only one restraining handle 220, as could be the case in a vertical arrangement or in an arrangement where the tubular segment is also retained by a partially or fully enclosed second cradle.

Another aspect of the disclosure is a spring retention assembly. In the embodiments shown, each restraining handle 220, 420, 520 is also longitudinally displaceable and is held in place by spring retention assembly 230, 430, 530. By "longitudinally displaceable" it is meant that restraining handle 220, 420, 520 can be displaced along axis X both towards and away from the cradles. Spring retention assembly 230, 430, 530 is for holding handle 220, 420, 520 against a stored tubular segment 202 when handle 220, 420, 520 is in the storage position by providing a spring force in the direction of the cradles. Spring retention assembly 230, 430, 530 can also be for frictionally retaining handle 220, 420, 520 in the release position when rotated to that position. Many different embodiments of spring assemblies exist and are useful for either of these purposes in addition in addition the three following examples.

In the embodiment shown in FIGS. 1-7, spring assembly 230 is comprised of compression spring 231, stem protrusion 223, first plate 232 and second plate 233. First plate 232 is fixedly attached to the frame arrangement bracket corresponding to each handle 220. As shown, stem 221 is positioned through apertures 232a, 233a within first and second plates 232, 233. Second plate 233 is retained onto handle 220 by stem protrusion 223, located on stem 221. Compression spring 231 is shown as being coaxially located about stem 221 and between first and second plates 232, 233. Thus, when gripper portion 222 of handle 220 is longitudinally displaced away from the cradles, stem protrusion 223 draws second plate 233, guided by slots 433b, towards first plate 232 thereby compressing spring 231. When a tubular segment 202 is placed within a pair of cradles and handle 220 is placed in the storage position, the spring retention assembly 230 draws gripper portion 222 against tubular segment 202 and secures it in place. Finally, when handle 220 is moved to the release position, the spring force of spring retention assembly 230 provides a frictional force between protrusions 224 and the outer face 235 of first plate 232 which frictionally retains handle 220 in the release position.

In the embodiment shown in FIGS. 8-9, spring assembly 430 is comprised of a compression spring 431, stem protrusion 423, a first plate 432, a second plate 433 and a third plate 434. The first and third plates 432, 434 are fixedly attached to the frame arrangement bracket corresponding to each handle 420. Second plate 433 is retained onto handle 420 by stem protrusion 423, located on stem 421. As shown, stem 221 is positioned through apertures 232a, 233a, 234a within the first, second and third plates 232, 233, 234. Compression spring 431 is shown as being coaxially located about stem 421 and between first and third plates 432, 434. Thus, when gripper portion 422 of handle 420 is longitudinally displaced away from the cradles, stem protrusion 423 draws second plate 433, guided by slots 433b, towards third plate 434 thereby compressing spring 431. When a tubular segment 202 is placed within a pair of cradles and handle 420 is placed in the storage position, the spring retention assembly 430 draws gripper portion 422 against tubular segment 202 and secures it in place. Finally, when handle 420 is moved to the release position, the spring force of spring retention assembly 430 provides a frictional force between protrusions 424 and the outer face 436 of first plate 432 which frictionally retains handle 420 in the release position.

In the embodiment shown in FIGS. 10-11, spring assembly 530 is comprised of compression spring 531, stem protrusion 523, first plate 532, second plate 533 and housing 534. First plate 532 and housing 534 are fixedly attached to the frame arrangement bracket corresponding to each handle 520. As shown, stem 521 is positioned through apertures 532a, 533a within first and second plates 532, 533 and within housing 534, which is generally cylindrical. Second plate 233 is located within housing 534 and retained onto handle 520 by stem protrusion 523, located on stem 521. Compression spring 531 is shown as being within housing 534, coaxially located about stem 521 and between first and second plates 532, 533. Thus, when gripper portion 522 of handle 520 is longitudinally displaced away from the cradles, stem protrusion 523, guided by guide slots 535, draws second plate 533 towards first plate 532 thereby compressing spring 231. When a tubular segment 202 is placed within a pair of cradles and handle 520 is placed in the storage position, the spring retention assembly 530 draws gripper portion 522 against tubular segment 202 and secures it in place. Finally, when handle 520 is moved to the release position, the spring force of spring retention assembly 530 provides a frictional force between stem protrusion 523 and guide slots 535 which frictionally retains handle 520 in the release position.

With respect to all of the aforementioned exemplary embodiments of a spring retention assembly, it is not necessary that the compression spring be coaxially located about a handle stem and it is possible to have more than one compression spring. Further, one skilled in the art will appreciate that the spring force created by spring retention assembly is advantageous because no further adjustments are required to secure a tubular element other than to simply place a handle in the desired position. One skilled in the art will also appreciate that the above described embodiments allow for a tubular segment to be easily secured to the cradles regardless of existing irregularities in the surface and contour of the tubular segment 202.

Another aspect of the disclosure is a locking mechanism. In the embodiments shown, each restraining handle 220, 420, 520 is provided with a locking mechanism 240, 440, 540. Locking mechanism 240 is for securing each handle 220, 420, 520 in an engaged, locked position such that handle 220, 420, 520 cannot rotate out of the storage position unless locking mechanism 240, 440, 540 is disengaged to an unlocked position. Many different types of locking mechanisms are possible and useful for this purpose in addition to the three following examples.

In the example embodiment shown in FIGS. 1-7, locking mechanism 240 includes protrusion members 224 that are fixedly attached to each restraining handle 220. Locking mechanism 240 also includes recesses 234 defined by first plate 232, although the recesses 234 can be located on other fixed portions of frame arrangement 210. When handle 220 is in the storage position, protrusion members 224 are located within corresponding recesses 234, thereby causing locking mechanism 240 to be engaged in the locked position. In the locked position, handle 220 is prevented from rotating out of the storage position. When handle 220 is longitudinally displaced, away from the cradles and against the spring force of the spring retention assembly 230, protrusion members 224 are drawn out of recesses 234 thereby causing the locking mechanism to be disengaged to the unlocked position. In the unlocked position, handle 220 can then be rotated to the release position. Additionally, the ends of protrusion members 224 can be configured to be slideable across outer face 235 of first plate 232 when handle 220 is in the unlocked position.

In the example embodiment shown in FIGS. 8-9, locking mechanism 440 includes protrusion members 424 that are fixedly attached to each restraining handle 420. Locking mechanism 440 also includes recesses 435 defined by first plate 432, although the recesses 434 can be located on other fixed portions of frame arrangement 210. When handle 420 is in the storage position, protrusion members 424 are located within corresponding recesses 435, thereby causing locking mechanism 440 to be engaged in the locked position. In the locked position, handle 420 is prevented from rotating out of the storage position. When handle 420 is longitudinally displaced, away from the cradles and against the spring force of the spring retention assembly 430, protrusion members 424 are drawn out of recesses 435 thereby causing the locking mechanism to be disengaged to the unlocked position. In the unlocked position, handle 420 can then be rotated to the release position. Additionally, the ends of protrusion members 424 can be configured to be slideable across outer face 436 of first plate 232 when handle 220 is in the unlocked position.

In the example embodiment shown in FIGS. 10-11, locking mechanism 540 includes a pair of L-shaped guide slots 535 located on opposite sides of housing 534 and stem protrusion 523. In the embodiment shown, each L-shaped guide slot 535 has an axial portion 535a and a radial portion 535b wherein the axial portion 535a is parallel to the length of stem 521. Radial portion 535b is perpendicular to the axial portion 535a and located at an end of axial portion 535a that is closest to gripper portion 522 of handle 520. As shown, stem protrusion 523 passes through two guide slots 535 such that the movement of stem protrusion 523 is constrained by a path defined by the guide slots 535. When handle 520 is in the storage position, protrusion members 523 are located within the axial portion 535a of the guide slots 535, thereby causing locking mechanism 540 to be engaged in the locked position. In the locked position, handle 520 is prevented from rotating out of the storage position. When handle 520 is longitudinally displaced, away from the cradles and against the spring force of the spring retention assembly 530, protrusion member 523 is drawn to the end of the axial portion 535a of the guide slot 535 and to radial portion 535b of guide slot 535, thereby causing the locking mechanism to be disengaged to the unlocked position. In the unlocked position, handle 220 can then be rotated along the radial portion 535b of guide slot 535 to the release position.

With respect to the aforementioned exemplary embodiments of locking mechanisms, it should be recognized by one skilled in the art that the number of protrusions, recesses, guide slots and other components can be of any quantity. It should also be apparent that other means for locking the handle in the storage position can be used as well; for example cylinder locks, spring locks, locking pins, locking cams and bars inserted through multiple handles, to name but a few. It should also be understood that the locking mechanism, spring retention assembly and frame arrangement can be combined to share various components or may be entirely separate mechanisms.

Figure 2:
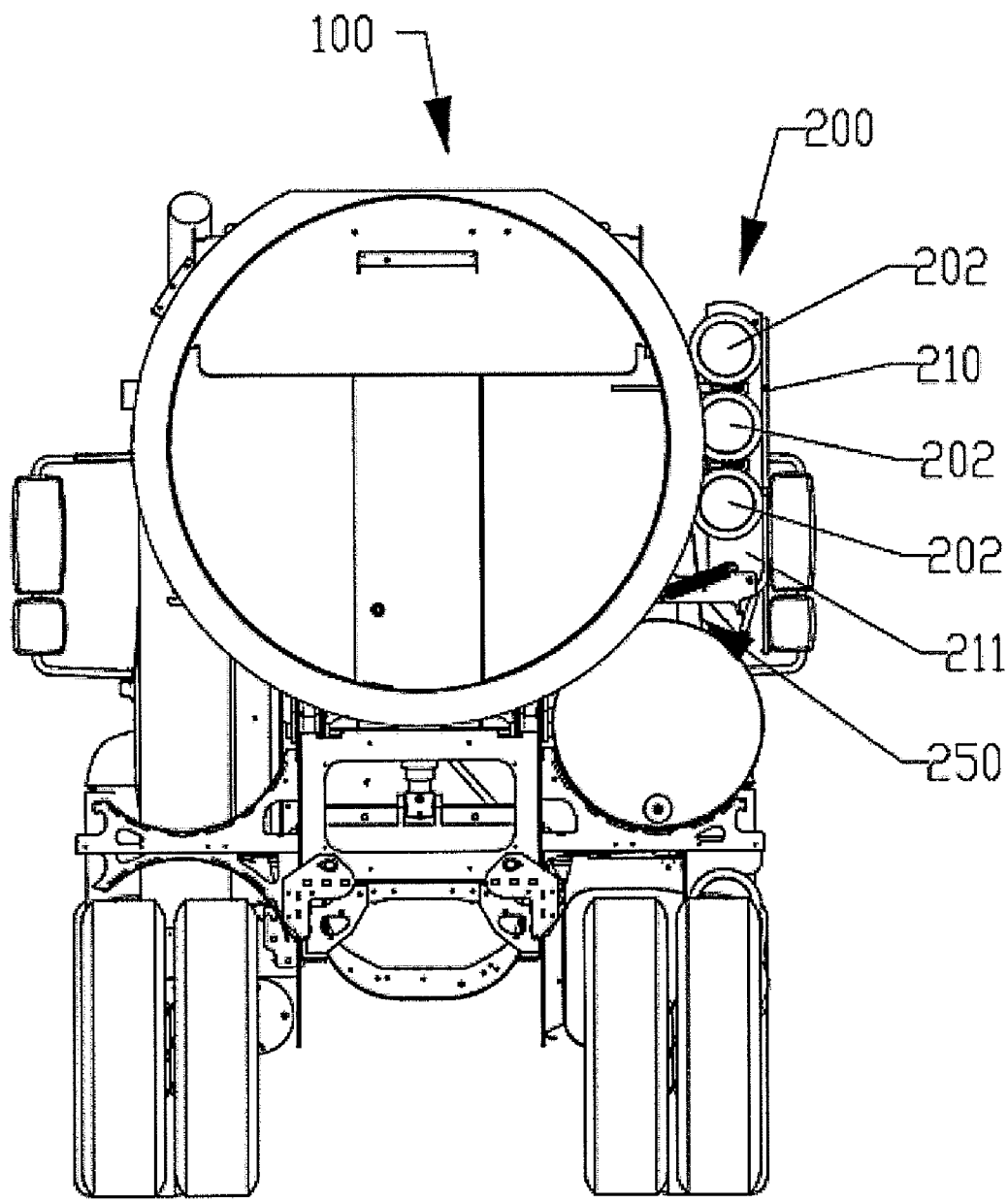
FIG. 2 is a rear view of the disclosed storage mechanism of FIG. 1, as installed on a vehicle and in a storage position.
Figure 3:
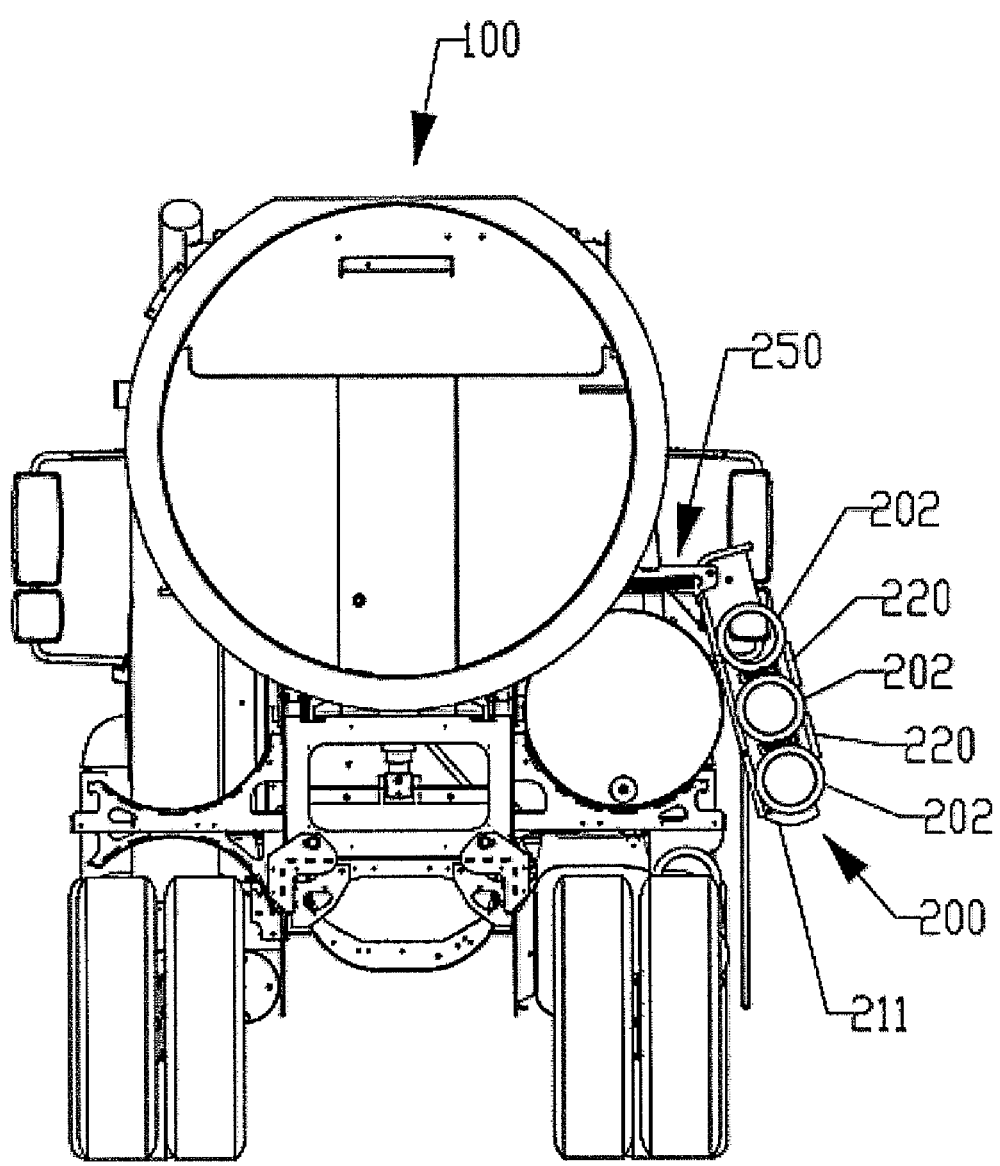
FIG. 3 is a rear view of the disclosed storage mechanism of FIG. 1, as installed on a vehicle and in an access position.

In the embodiment shown, storage mechanism 200 is mounted to a vehicle 100 via a pair of support bracket assemblies 250. Support bracket assemblies 250 are for securing support frame 210 to a vehicle and for allowing storage mechanism 200 to move from one position to another, and in some cases, from a storage position to an access position. Many types of support bracket assemblies are possible and useful for this purpose. In the example embodiment shown, a support bracket assembly 250 includes a pair of mounting brackets 251 and support springs 252. Each mounting bracket 251 is fixedly mounted to vehicle 100 and pivotally connected to storage frame 200. One end of support spring 252 is connected to mounting bracket 250 while the other end of support spring 252 is connected to storage frame 200. In the storage position, handles 220 and cradles 212, 214 of storage mechanism 200 generally face towards the surface of vehicle 100. FIGS. 1-2 show storage mechanism 220 in the storage position. In the access position, handles 220 and cradles 212, 214 are facing generally away from a surface of vehicle 100. FIGS. 3-4 show storage mechanism 200 in the access position. Storage mechanism 200 can be rotatable from the storage position to the access position about an axis A which may be parallel to the longitudinal axis V of vehicle 100. This axis may also be generally horizontal. In the embodiment shown, storage mechanism 200 can be rotated about a horizontal axis from the storage position to the access position such that support springs 252 are placed in tension. Support springs 252 allow a user to move storage mechanism 200 between the storage and access positions without having to accept the full weight of storage mechanism 200 and any stored tubular segments 202.

A positioner handle 217 is also shown at FIGS. 1 and 3-5 that is rotatably attached to frame arrangement 210 and allows the user to more easily rotate storage mechanism 200. A locking mechanism can also be provided to secure storage mechanism 200 in the storage position. In lieu of utilizing mounting brackets, storage mechanism 200 can also be rigidly mounted to a vehicle or other surface. For example, an embodiment having two pairs of cradles and one pair of restraining handles 220 for holding two tubular segments 202 is shown on FIG. 1 at 300.

This disclosure also relates to a method of storing tubular segments 202 in a storage mechanism 200. In a method for storing a tubular segment, the method can contain the steps of orienting a tubular segment into at least a pair of parallel cradles that are defined by a pair of brackets and securing the segment in the cradles by moving a first handle to move a gripper of the first handle over a first part of the segment and then moving a second handle to move a gripper of the second handle over a second part of the segment. The method of storing a tubular segment may also include the step of positioning the first and second handles to a locked position wherein a protrusion member on the handle engages a corresponding recess on a first plate. Additionally, the step of moving the storage to a mechanism storage position may also be included.

This disclosure also relates to a method of accessing a tubular segment 202 stored in a storage mechanism 200. In a method for accessing a tubular segment that is secured to cradles of a storage mechanism having first and second movable or rotatable restraining handles, the method can include the steps of rotating the storage mechanism from a storage position to an access position, releasing the segment in the cradles by moving the first handle away from the segment and then moving the second handle away from the segment and removing the tubular segment. The method may also include the step of longitudinally displacing each handle away from the cradles such that a locking arrangement is disengaged before the step of moving or rotating the first and second handles.

With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

What is claimed is:

1. A storage mechanism for holding and securing at least one tubular segment, the storage mechanism comprising:
   (a) a frame arrangement defining at least a pair of open ended cradles for holding a tubular segment;
   (b) at least one restraining handle, the handle being connected to the frame arrangement and movable between a storage position and a release position;
      (i) the storage position including the handle extending over at least one open ended cradle thereby securing the tubular segment to the frame arrangement;
      (ii) the release position including the open ended cradle being free of coverage by the handle, thereby allowing the tubular segment to be removed from the frame arrangement; and (c) a spring retention assembly, the spring retention assembly having a spring force that holds the restraining handle against the tubular segment when the restraining handle is in the storage position;

(d) a locking mechanism to prevent the restraining handle from moving out of the storage position; and (e) a support bracket assembly pivotally connected to the frame arrangement to allow the storage mechanism to pivot about the support bracket assembly.

2. The storage mechanism of claim 1, wherein the locking mechanism has a locked position and an unlocked position and is engaged in the locked position when the restraining handle is in the storage position and wherein the locking mechanism is disengaged in the unlocked position when the restraining handle is longitudinally displaced away from the cradles.

3. The storage mechanism of claim 2, wherein the locking mechanism comprises:

(a) at least one protrusion member located on the restraining handle; and (b) at least one recess that is defined by a fixed portion of the frame arrangement;

(c) wherein the locking mechanism is engaged in the locked position when the protrusion member is engaged within the recess; and (d) wherein the locking mechanism is disengaged in the unlocked position when the protrusion member is drawn out of the recess.

4. The storage mechanism of claim 3, wherein an end of the protrusion member is constructed and configured to slide across the outer face of a first plate when the locking mechanism is in the unlocked position, the first plate defining the recess of the fixed portion of the frame arrangement, wherein the spring force of the spring retention assembly provides a frictional force between the protrusion member and the outer face of the first plate.

5. The storage mechanism of claim 4, wherein the compression spring assembly further comprises a compression spring and a second plate, the retaining plate being longitudinally secured to a stem of the restraining handle by a stem protrusion, wherein the compression spring is compressed between the first and second plates.

6. A vehicle having a storage mechanism for holding and securing at least one tubular segment, the storage mechanism comprising:

(a) a frame arrangement defining at least a pair of open ended cradles for holding a tubular segment;

(b) at least one restraining handle, the handle being connected to the frame arrangement and movable between a storage position and a release position;
  (i) the storage position including the handle extending over at least one open ended cradle thereby securing the tubular segment to the frame arrangement;
  (ii) the release position including the open ended cradle being free of coverage by the handle, thereby allowing the tubular segment to be removed from the frame arrangement;

(b) a spring retention assembly, the spring retention assembly having a spring force that holds the restraining handle against the tubular segment when the restraining handle is in the storage position;

(c) the storage mechanism being mounted to the vehicle and movable between a storage position and an access position;
  (i) in the storage position, the cradles and the restraining handles generally facing a surface of the vehicle; and
  (ii) in the access position, the cradles and the restraining handle generally facing away from the surface of the vehicle;

(d) a locking mechanism to prevent the restraining handle from moving out of the storage position; and (e) a support bracket assembly fixed to the vehicle and pivotally connected to the frame arrangement to allow the storage mechanism to pivot about the support bracket assembly.

7. The vehicle of claim 6, wherein the storage mechanism is pivotable relative to the support bracket assembly about an axis generally parallel to the longitudinal axis of the vehicle.

8. The vehicle of claim 6, wherein the locking mechanism is engaged in a locked position when the restraining handle is in the storage position and wherein the locking mechanism is disengaged in an unlocked position when the restraining handle is longitudinally displaced away from the cradles.

9. The vehicle of claim 8, wherein the locking mechanism comprises:

(a) at least one protrusion member located on the restraining handle; and (b) at least one recess that is defined by a fixed portion of the frame arrangement;

(c) wherein the locking mechanism is engaged in the locked position when the protrusion member is engaged within the recess; and (d) wherein the locking mechanism is disengaged in an unlocked position when the protrusion member is drawn out of the recess.

* * * * *